United States Patent [19]

Namiki et al.

[11] Patent Number: 4,864,858
[45] Date of Patent: Sep. 12, 1989

[54] WHEEL UNBALANCE CORRECTION METHOD AND WHEEL UNBALANCE DETECTING APPARATUS

[75] Inventors: Ko Namiki; Tokio Kikuchi, both of Sayama, Japan

[73] Assignee: Honda Giken Kogyo Kabushiki Kaisha, Tokyo, Japan

[21] Appl. No.: 184,563

[22] Filed: Apr. 21, 1988

[30] Foreign Application Priority Data

Apr. 24, 1987 [JP] Japan .................................. 62-100116
Apr. 24, 1987 [JP] Japan ............................. 62-61454[U]

[51] Int. Cl.$^4$ ............................................. G01M 1/28
[52] U.S. Cl. ....................................................... 73/457
[58] Field of Search ...................... 73/457; 356/1, 373; 250/231 R

[56] References Cited

U.S. PATENT DOCUMENTS

| | | |
|---|---|---|
| 3,203,230 | 8/1965 | Reiser ..................... 73/457 |
| 3,238,785 | 3/1966 | Lodge et al. ............ 73/457 |
| 3,461,729 | 8/1969 | Haynes . |
| 3,526,873 | 9/1970 | Burt ....................... 73/457 |
| 3,560,951 | 2/1971 | Rigall et al. ............ 73/457 |
| 3,686,955 | 8/1972 | Butler .................... 73/457 |
| 3,762,225 | 10/1973 | Muller ................... 73/457 |
| 3,772,919 | 11/1973 | Senften .................. 73/457 |
| 3,815,425 | 6/1974 | Skidmore ............... 73/457 |
| 4,480,918 | 11/1984 | De Fazio ............... 356/373 |
| 4,555,943 | 12/1985 | Ohta et al. ............. 73/457 |

FOREIGN PATENT DOCUMENTS

| | | |
|---|---|---|
| 62-5142 | 1/1987 | Japan . |
| 1046709 | 10/1966 | United Kingdom . |
| 1333001 | 10/1973 | United Kingdom . |
| 1450558 | 9/1976 | United Kingdom . |
| 1498153 | 1/1978 | United Kingdom . |

Primary Examiner—Stewart J. Levy
Assistant Examiner—Robert P. Bell
Attorney, Agent, or Firm—Armstrong, Nikaido, Marmelstein, Kubovcik & Murray

[57] ABSTRACT

A wheel attached to a vehicle body via a suspension mechanism including an unsprung member is placed on and rotated by a rotating drum. A phase detector detects the rotational phase of the rotating wheel. A support table positioned adjacent the rotating drum is movable on three mutually perpendicular axes. A spring plate mounted on the support table is placed in resilient contact with a measuring surface of the unsprung member. The spring plate vibrates in response to vibration of the unsprung member in the longitudinal direction which in turn vibrates in response to wheel unbalance. A displacement detector on the support table includes a light source and light receiving elements which detect vibration of the spring plate caused by movement of the unsprung member in the longitudinal direction and thus detect wheel unbalance. Upon detecting wheel unbalance, a weight is selected which corresponds to the detected longitudinal amplitude of vibration of the unsprung member in accordance with a predetermined relationship between the longitudinal amplitude and the weight and the weight is attached to the rim of the wheel at an unbalanced point.

3 Claims, 4 Drawing Sheets

WHEEL UNBALANCE CORRECTION METHOD AND WHEEL UNBALANCE DETECTING APPARATUS

BACKGROUND OF THE INVENTION

1. Field of the Invention

The present invention relates to a method of correcting the wheel unbalance of a vehicle and to a wheel unbalance detecting device.

2. Description of the Prior Art

When a wheel of a vehicle is unbalanced, it is known that vibrations occur in the vertical, longitudinal and lateral directions during rotation of the wheel. (The lateral direction herein refers to the steering or vehicle side direction)

Generally, the vertical and longitudinal vibrations are considered to result from a circumferential weight unbalance (static unbalance) of the wheel. The lateral vibration is considered to be caused by a lateral weight unbalance (dynamic unbalance) of the wheel. The inventor of this invention previously proposed, in the Japanese Patent Application No. 142627/1985, a wheel unbalance correction method wherein a wheel attached to a vehicle body via a suspension mechanism is placed and rotated on a rotating drum to detect the three amplitudes in the vertical, longitudinal and lateral directions of an unsprung member of the wheel suspension mechanism other than the wheel itself. The amount of the static unbalance is then determined from the vertical and longitudinal amplitudes and the amount of the dynamic unbalance from the lateral amplitude. Weights corresponding to these amounts of the unbalances are attached to the respective unbalance points on the rim of the wheel for correction of the wheel unbalances.

Even with the above method, however, the wheel unbalance cannot always be corrected as desired and there are instances where a wheel unbalance correction has to be repeated.

The analysis conducted by this inventor has revealed the cause of the above problem is that the vertical vibration of the unsprung member is affected by the suspension function of the suspension mechanism and by the uniformity of the tire, indicating that there is no unitary relationship between the vertical amplitude and the static wheel unbalance. Likewise, the lateral vibration is affected by the vertical and longitudinal vibrations of the wheel, resulting from the static wheel unbalance. Further, the lateral vibration is affected through a gyroscopic action resulting from the vertical and longitudinal vibrations, and also by the compliance in the lateral direction of the suspension mechanism, again indicating that there is no unitary relationship between the lateral amplitude and the dynamic wheel unbalance. The problem, therefore, comes from the fact that a weight is selected on the basis of these unrealistic amplitudes.

SUMMARY OF THE INVENTION

In light of the above problem, the present invention has it for its objective to provide a wheel unbalance correction method that overcomes the problems of the above-mentioned prior art.

To achieve the above objective, the present invention provides a wheel unbalance correction method in which a wheel, attached to a vehicle body via a suspension mechanism, is placed and rotated on a rotating drum to detect a wheel unbalance thereof and, according to the detected result, the wheel unbalance is corrected. The method is characterized in that it comprises the steps of detecting the wheel unbalance as a longitudinal amplitude of vibration of an unsprung member of the wheel suspension mechanism other than the wheel itself; selecting according to a predetermined relationship between the longitudinal amplitude and the weight, an appropriate weight that corresponds to the detected amplitude; and then attaching the selected weight to the rim of the wheel at the unbalanced point.

Unlike the vertical and lateral vibrations, the longitudinal vibration of the unsprung member is practically unaffected by the suspension mechanism and thus, the static unbalance of the wheel directly appears as the longitudinal vibration. Therefore, there is a definite, unitary relationship between the longitudinal amplitude and the static wheel unbalance, so that, by attaching a weight corresponding to the longitudinal amplitude, it is possible to correct the static unbalance and thereby suppress the vertical and longitudinal vibrations that result from the static unbalance. This in turn restrains the lateral vibration that is caused by the vertical and longitudinal vibrations through the gyroscopic action.

DETAILED DESCRIPTION OF THE PREFERRED EMBODIMENT

Figure 1:
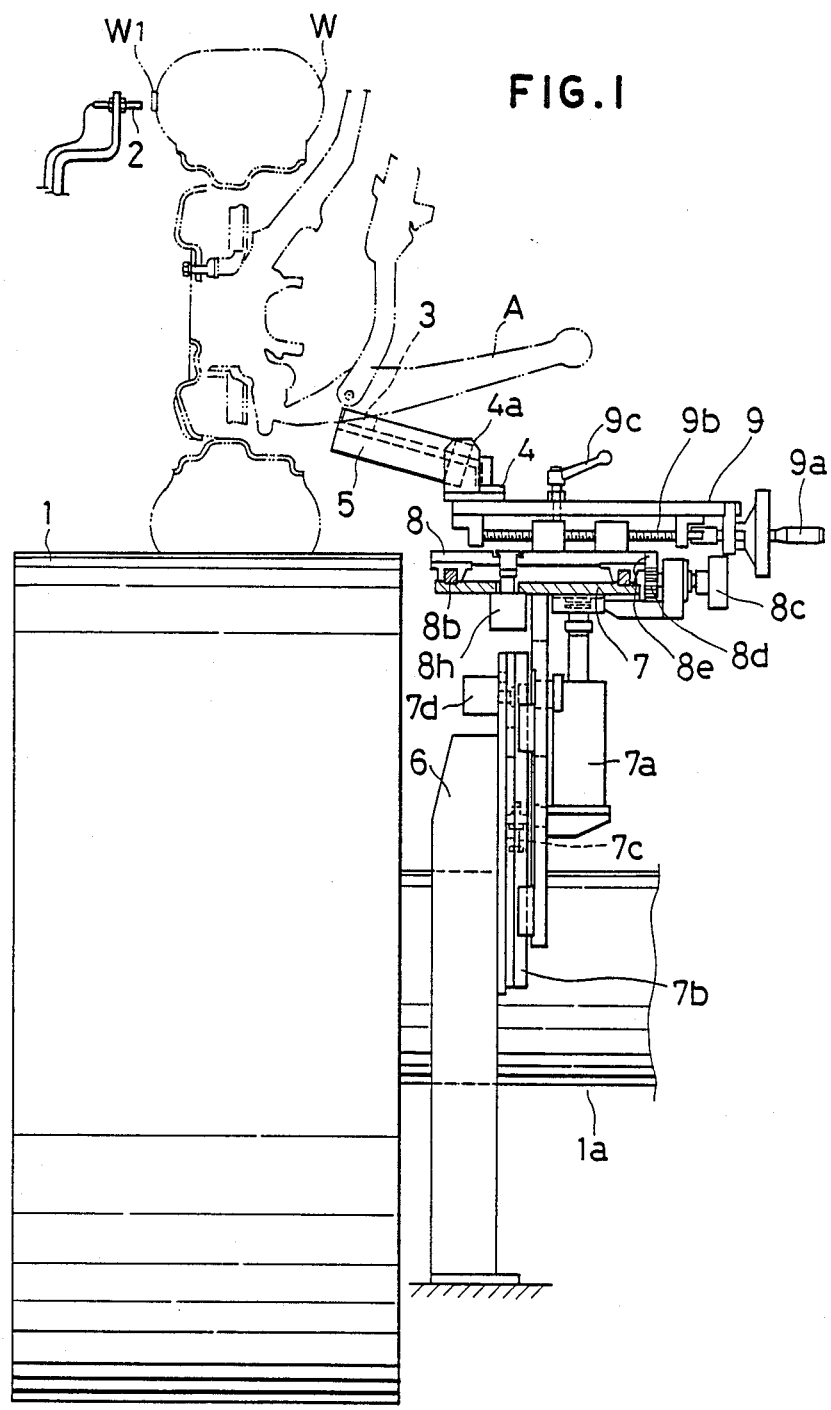
FIG. 1 is a front view showing an essential portion of the unbalance detecting device of the preferred embodiment of the present invention.
Figure 2:
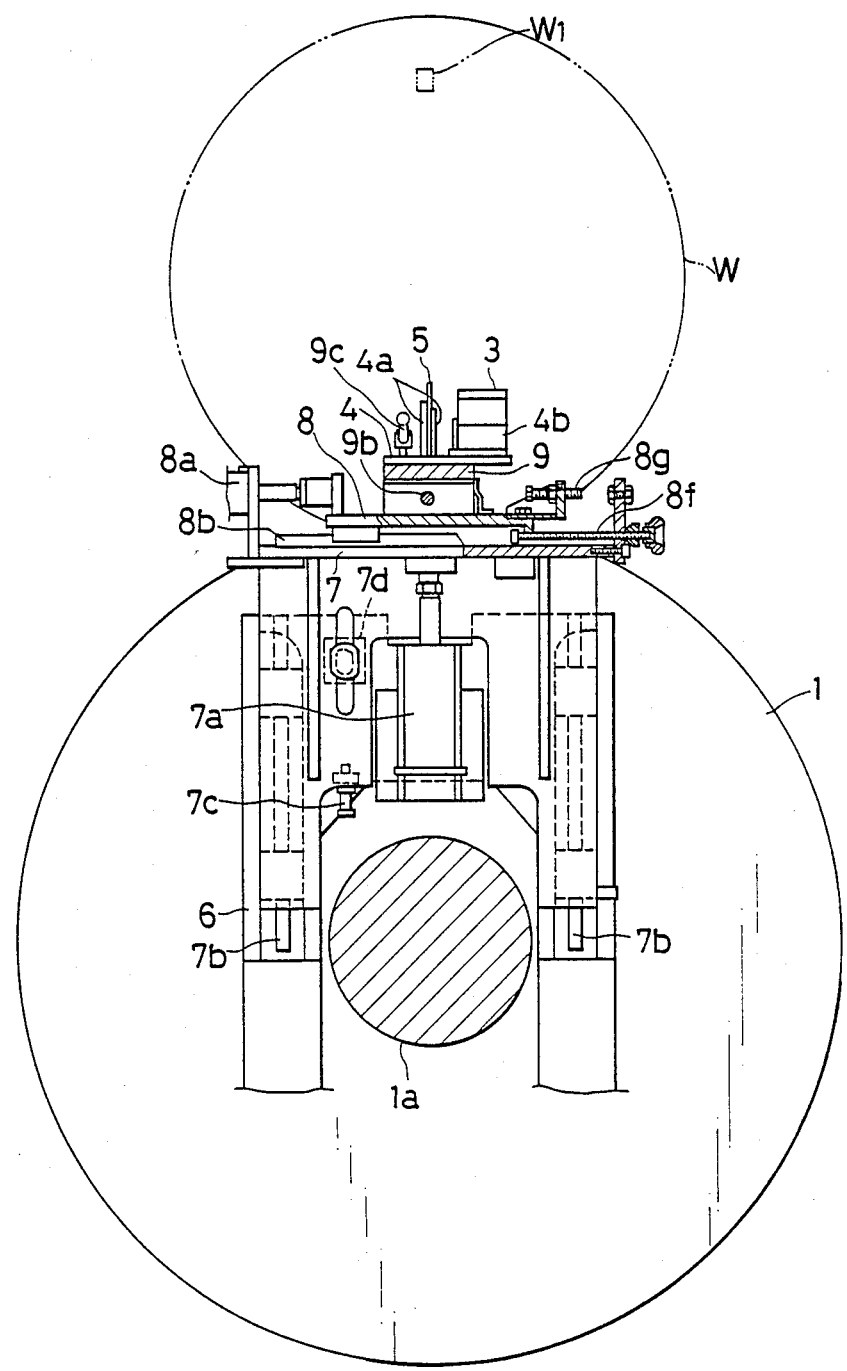
FIG. 2 is a side view, partly in section, of the unbalance detecting device of FIG. 1.
Figure 3:
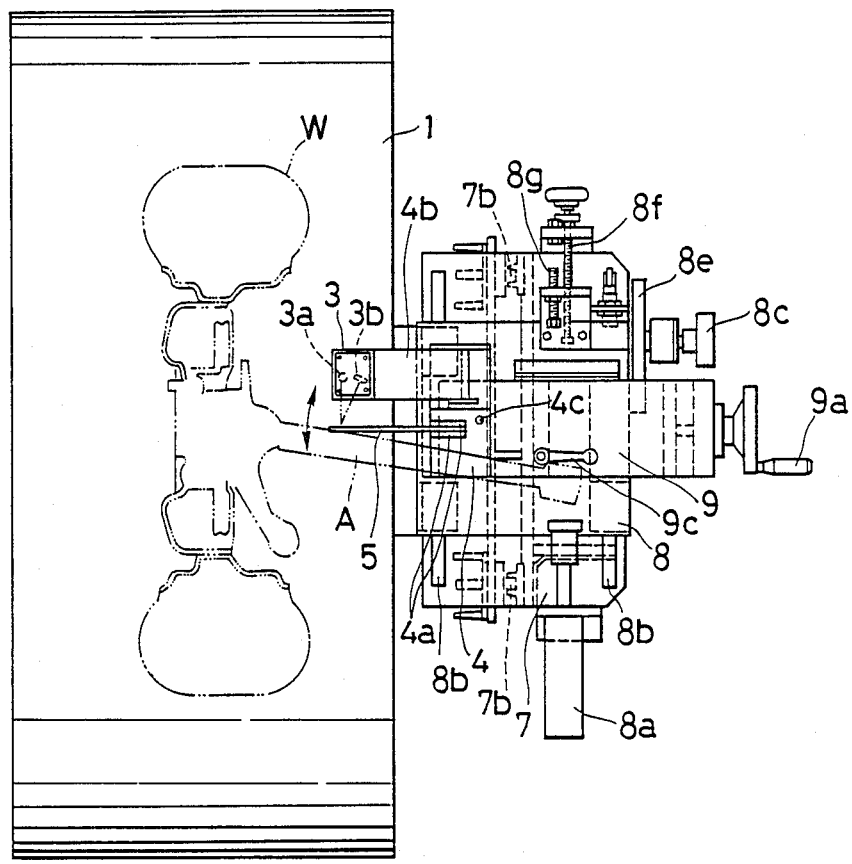
FIG. 3 is a plan view of the unbalance detecting device of FIG. 1.

Referring to FIGS. 1 through 3, a wheel W attached to the vehicle body of an automobile via a suspension mechanism rests on a rotating drum 1 having a shaft 1a. A phase detector 2, which includes a photoelectric tube, cooperates with a reflection tape $W_1$, attached to the wheel W to detect the rotation phase of the wheel W. A displacement detector 3 detects the longitudinal displacement of a lower suspension arm A which is an unsprung member of the suspension mechanism. In this arrangement, the longitudinal amplitude of the lower suspension arm A, with the wheel W being rotated at a constant speed on the rotating drum 1, is determined from the displacement variation detected by the displacement detector 3, and the unbalance of the wheel W is thus measured.

The displacement detector 3 is of a known structure comprising a light source 3a and an image focusing portion 3b. The light source 3a radiates a beam of light onto an object to be measured and forms a light spot on it. The image focusing portion 3b has a plurality of light receiving elements arranged in a row for receiving the light spot formed thereon by the light beam. The image focusing portion 3b is arranged so that it obliquely crosses the light axis of the light source 3a, thereby detecting the displacement of the object with respect to the light axis direction as a change in the position of the light spot on the image focusing portion 3b. A support table 4 is provided which is movable along three mutually perpendicular axes-vertical, longitudinal and lateral axes. A spring plate 5 is mounted on the support table 4, the spring plate 5 being in resilient contact with the front or rear surface of the lower suspension arm A. The displacement detector 3 is disposed opposite to the spring plate 5.

More in detail, a machine frame 6 is positioned on the inner side with respect to the location of the rotating drum 1. A first table 7 on the machine frame 6 is moved up and down along a guide rail 7b by a cylinder 7a. The first table 7 has a second table 8 thereon which is driven longitudinally along a guide rail 8b by a cylinder 8a, and the second table 8 has a third table 9 thereon which is driven laterally by a ball screw 9b with a handle 9a. The support table 4 is mounted on the third table 9. The spring plate 5 extending laterally outwardly, is secured at its inner end to clamping pieces 4a of the support table 4. The displacement detector 3 is mounted on a stay 4b, which extends laterally outwardly from the support table 4, such that the displacement detector 3 longitudinally faces the outer end of the spring plate 5.

The first table 7 is provided with an adjustment screw 7c to adjust the elevated position of the table 7 so as to align the height of the spring plate 5 with that of the lower suspension arm A. The second table 8 has a rack 8e which is interlocked, through a pinion 8d, with a fine adjustment handle 8c located on the side of the first table 7. When the apparatus is to be adjusted, the second table 8 is moved slightly by the fine adjustment handle 8c until the spring plate 5 is properly pressed for resilient contact with the measuring surface of the lower arm A. To stop the forward movement of the second table 8 at this position, a forward movement stopper guide screw 8f is adjusted. An adjustment screw 8g is provided on the second table 8 for setting a retracted position of the table 8 and is adjusted to set the retracted position such that the spring plate 5 does not interfere with the lower suspension arm A when the second table 8 is elevated. The third table 9 is provided with a lock handle 9c which locks the third table 9 to the second table 8. After being adjusted by the ball screw 9b so as to align the lateral positions of the spring plate 5 and the lower suspension arm A with each other, the third table 9 is fixed at that position by means of the lock handle 9c.

The support table 4 is turnable about a vertical shaft 4c within a predetermined angular range with respect to the third table 9 so that the angle at which the spring plate 5 contacts the lower suspension arm A can be adjusted appropriately.

A clamp cylinder 7d for the first table 7 is provided on the machine frame 6 and a clamp cylinder 8h for the second table 8 is provided on the first table 7.

Next, operation of the above-described unbalance detecting apparatus will be explained.

With the wheel W resting on the rotating drum 1, the first table 7 is elevated to its elevated position and then the second table 8 is moved to the advanced position to put the spring plate 5 in resilient contact with the measuring surface of the lower suspension arm A. In this state, the wheel W is rotated at a constant speed. If the wheel W is unbalanced, the lower suspension arm A vibrates back and forth causing the spring plate 5 in resilient contact therewith to vibrate back and forth therewith.

At this time, a light spot is formed on the surface of the spring plate 5 by the beam of light from the light source 3a of the displacement detector 3 which is disposed opposite to the spring plate 5. The light is reflected from the spring plate 5 onto the image focusing portion 3b of the detector 3. From the change in the position of the light spot, the longitudinal displacement of the spring plate 5 and consequently of the lower suspension arm A that moves the spring plate 5 is detected.

It is possible to omit the spring plate 5 and direct the beam from the light source 3a of the displacement detector 3 onto the measuring surface of the unsprung member. This, however, makes the accurate measurement of the displacement difficult because an unsprung member such as lower suspension arm A is usually formed by forging or casting and has a coarse surface with scatters the beam from the light source 3a, thus lowering the brightness of the light spot focused on the image focusing portion 3b.

Figure 4:
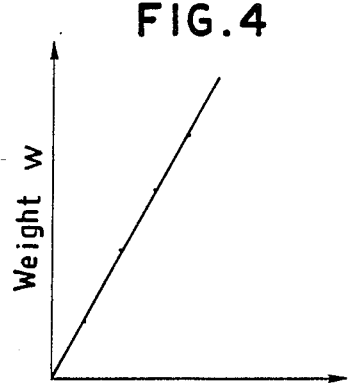
FIG. 4 is a tuning chart.

For correcting the unbalance of the wheel W, a tuning chart such as shown in FIG. 4 representing the relationship between the longitudinal amplitude L of the lower suspension arm A and the weight w of a weight is prepared beforehand.

The tuning chart is produced in the following way. The balanced wheels are mounted onto an automobile, and a weight is attached to the rim of the wheel at a predetermined circumferential position. The wheel is rotated on the rotating drum 1 at a constant speed. The rotation phase detected by the phase detector 2 and the longitudinal displacement of the lower suspension arm A detected by the displacement detector 3 are recorded by a two-pen recorder. This measurement is taken repetitively, each time with a different weight. The amplitude as determined from the maximum displacement with each weight is then plotted to make the chart.

The phase at which the longitudinal displacement is maximum occurs when the weight mounting position is aligned with a longitudinal horizontal line passing through the axle. On the recording paper, however, the maximum displacement is indicated as if occurring with some phase difference from the time the weight mounting position becomes aligned with the horizontal line because of the time lag of the recorder. This phase difference is determined as a compensation angle P beforehand. Next, the wheel W attached to a test automobile via a suspension mechanism is placed on the rotating drum 1 and is rotated at the same speed as in the above experiment to record the rotation phase and the longitudinal displacement of the lower suspension arm A by the two-pen recorder.

Figure 5:
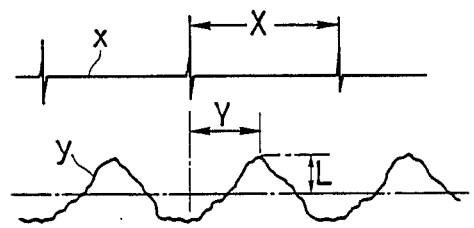
FIG. 5 is a diagram showing the data as measured by the phase detector and the displacement detector of the present invention.

In FIG. 5, line x and line y represent the rotation phase and the displacement respectively. Each time the wheel W completes one full turn in which the reflection tape $W_1$ attached thereto moves past the phase detector 2, a pulse appears on line x. Y is the distance on the recording sheet from the point of the pulse to the peak point on the y line which is the point at which the displacement in the direction toward the displacement detector becomes largest. X is the interval between the pulses as indicated on the recording sheet. The reflection tape $W_1$ is attached at the 0° position. The phase angle Z of the displacement peak can be expressed as follows:

$$Z = \frac{Y}{X} \times 360°$$

Then, the phase angle Q of the unbalanced point of the wheel W can be obtained from Z or the phase angle of the displacement peak and P or the compensation angle and expressed as below.

$$Q = (Z - P) + 180°$$

The amplitude L is determined from the wave height at the peak point on the y line. A weight corresponding to the amplitude L is then selected by consulting with the tuning chart and is attached to the unbalanced point on the rim of the wheel W.

Figure 6:
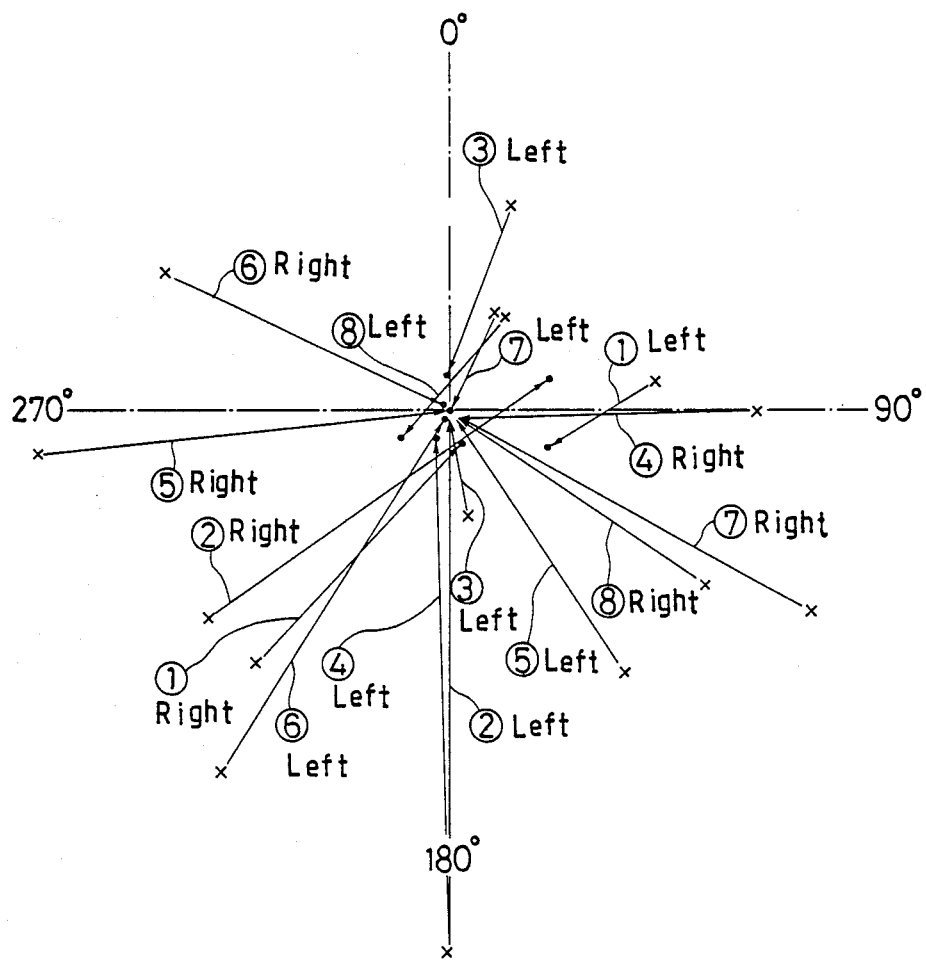
FIG. 6 is a graph showing in polar coordinates, the results of experiments using the present invention.

FIG. 6 shows the unbalances of the left and right front wheels of eight tested automobiles, 1 to 8, before and after the correction was made according to the above method. In the polar coordinates of FIG. 6, the radial direction represents the longitudinal amplitude and the circumferential direction represents the phase angle, with the markings x and . indicating the before and after correction unbalances respectively. It is seen therefrom that the wheel unbalance is greatly improved.

The table below shows the lateral amplitude of the steering wheels of the above-mentioned tested automobiles (the lateral amplitudes corresponding to the amplitudes of the wheel in the vehicle side or steering direction). The table indicates that the steering wheel's lateral vibration can also be greatly reduced by making correction of the unbalance resulting from the longitudinal vibration alone.

| Automobile number | Lateral vibration of the steering wheel | |
| --- | --- | --- |
| | Before Correction | After Correction |
| 1 | 0.44 | 0.22 |
| 2 | 0.45 | 0.07 |
| 3 | 0.44 | 0.17 |
| 4 | 0.52 | 0.33 |
| 5 | 0.39 | 0.22 |
| 6 | 0.41 | 0.28 |
| 7 | 0.22 | 0.09 |
| 8 | 0.22 | 0.11 |

According to this invention, the wheel unbalance is corrected only on the basis of the longitudinal vibration of the unsprung member which directly represents the wheel unbalance. Unaffected by the suspension mechanism, this correction method can achieve the wheel unbalance correction with a single corrective operation to such a degree that there is practically no problem remaining and thus, it contributes to the improvement of productivity.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:
1. A wheel unbalance detecting device comprising:
   a rotating drum means for receiving thereon a wheel to be balanced;
   a phase detector means for detecting the rotational phase of a wheel rotating on the rotating drum;
   a support table means positioned adjacent the rotating drum, the support table means being movable along three mutually perpendicular axes;
   a spring plate means for placement in resilient contact with a measuring surface of an unsprung member connected to the wheel, the spring plate means being mounted on the support table means, wherein the measuring surface of the unsprung member vibrates in response to wheel unbalance in the longitudinal direction with respect to the wheel; and
   a displacement detector mounted on support means facing the spring plate means, the displacement detector comprising a light source and a plurality of light receiving elements arranged in a row for receiving light from the light source, wherein the light source radiates a beam of light onto the spring plate means and the spring plate means reflects the light beam on to at least one of the light receiving elements and wherein the vibration of the spring plate means, caused by the movement of the unsprung member in the longitudinal direction, cause the reflected light beam to move to another at least one light receiving element, thereby providing an indication of the longitudinal movement of the unsprung member, the longitudinal movement of the unsprung member being a function of the wheel unbalance.

2. A wheel unbalance detecting device as set forth in claim 1, wherein the support table means comprises:
   a first table for movement in the vertical direction;
   a second table mounted on the first table, for movement in the longitudinal direction;
   a third table mounted on the second table, for movement in the lateral direction; and
   a support table mounted on the third table, wherein the spring plate means is mounted on the support table and wherein the vertical, longitudinal, and lateral movement of the first, second and third tables brings the spring plate means into contact with the unsprung member.

3. A wheel unbalance detecting device as set forth in claim 2, wherein the displacement detector is mounted on the support table.

* * * * *